US011332335B2

(12) United States Patent
Haapanen

(10) Patent No.: US 11,332,335 B2
(45) Date of Patent: May 17, 2022

(54) REELING SHAFT TRANSFER RAIL SYSTEM AND METHOD OF TRANSFERRING REELING SHAFTS ON A REELING SHAFT TRANSFER RAIL SYSTEM

(71) Applicant: Valmet Technologies Oy, Espoo (FI)

(72) Inventor: Jaakko Haapanen, Järvenpää (FI)

(73) Assignee: Valmet Technologies Oy, Espoo (FI)

( * ) Notice: Subject to any disclaimer, the term of this patent is extended or adjusted under 35 U.S.C. 154(b) by 224 days.

(21) Appl. No.: 16/792,638

(22) Filed: Feb. 17, 2020

(65) Prior Publication Data

US 2020/0262668 A1 Aug. 20, 2020

(30) Foreign Application Priority Data

Feb. 18, 2019 (EP) .................................... 19157656

(51) Int. Cl.
*B65H 19/12* (2006.01)
*B65H 19/10* (2006.01)
(Continued)

(52) U.S. Cl.
CPC ......... *B65H 19/126* (2013.01); *B65G 35/005* (2013.01); *B65H 19/10* (2013.01); *B65H 19/30* (2013.01); *B65H 2301/41734* (2013.01)

(58) Field of Classification Search
CPC ...... B65H 19/10; B65H 19/30; B65H 19/126; B65H 2301/41342; B65H 2301/41734;
(Continued)

(56) References Cited

U.S. PATENT DOCUMENTS 3,045,611 A * 7/1962 Murray ................. F15B 15/106
104/155
3,318,262 A * 5/1967 Ganzinotti .............. B61B 13/04
104/155
(Continued)

FOREIGN PATENT DOCUMENTS

CN 1312761 A 9/2001
CN 102414100 A 4/2012
(Continued)

OTHER PUBLICATIONS

European Search Report for EP19157656 dated Aug. 7, 2019.
Search Report for CN2020100957634 dated Apr. 30, 2021.

*Primary Examiner* — Zachary L Kuhfuss
(74) *Attorney, Agent, or Firm* — Stiennon & Stiennon

(57) ABSTRACT

A reeling shaft transfer rail system has two parallel substantially horizontal or slightly sloped rails for supporting the ends (25) of a reeling shaft (20). Hoses are arranged on each of the transfer rails (15) and filled or drained to move and hold the reeling shaft (20). In a method of transferring reeling shafts on transfer rails, the reeling shafts (20) are transferred on two parallel, substantially horizontal or slightly downstream of a main transfer direction inclined transfer rails (15) for supporting each of the supporting ends (25) of a reeling shaft (20). The reeling shafts (20) are transferred or positioned in the reeling shaft transfer rail system (10) by pressurizing hoses (17) arranged on each of the transfer rails. The hoses are arranged so fluid added to or withdrawn from the hoses pushes or holds the reeling shaft (20) on the transfer rails (15).

16 Claims, 2 Drawing Sheets

(51) Int. Cl.
*B65G 35/00* (2006.01)
*B65H 19/30* (2006.01)

(58) Field of Classification Search
CPC ............ B65H 2406/20; B65H 2406/41; B65H 2801/84; B65G 35/00; B65G 35/005
See application file for complete search history.

(56) References Cited

U.S. PATENT DOCUMENTS

| | | | | |
|---|---|---|---|---|
| 3,673,924 | A | * | 7/1972 | Zakrzewski .......... F15B 15/106 91/462 |
| 3,687,083 | A | * | 8/1972 | Brown .................... B62D 65/00 104/155 |
| 3,828,687 | A | | 8/1974 | McKeen |
| 5,370,327 | A | * | 12/1994 | Adamski ................ B65H 18/26 242/533.1 |
| 5,673,870 | A | * | 10/1997 | Fielding ............. B65H 19/2207 242/532.2 |
| 10,144,607 | B2 | * | 12/2018 | Hyotynen .......... B65H 19/2253 |
| 2012/0048986 | A1 | * | 3/2012 | Enwald ................ B65H 19/126 242/526 |

FOREIGN PATENT DOCUMENTS

| CN | 206511620 | U | * | 9/2017 | ............. B65G 47/52 |
|---|---|---|---|---|---|
| DE | 2302626 | A | * | 7/1974 | ........... B65G 35/005 |
| DE | 3608318 | A1 | * | 9/1987 | ........... B65G 35/005 |
| EP | 3109192 | A1 | | 12/2016 | |
| GB | 1053150 | | | 12/1966 | |
| GB | 1441391 | | | 6/1976 | |
| GB | 1455688 | | | 11/1976 | |

\* cited by examiner

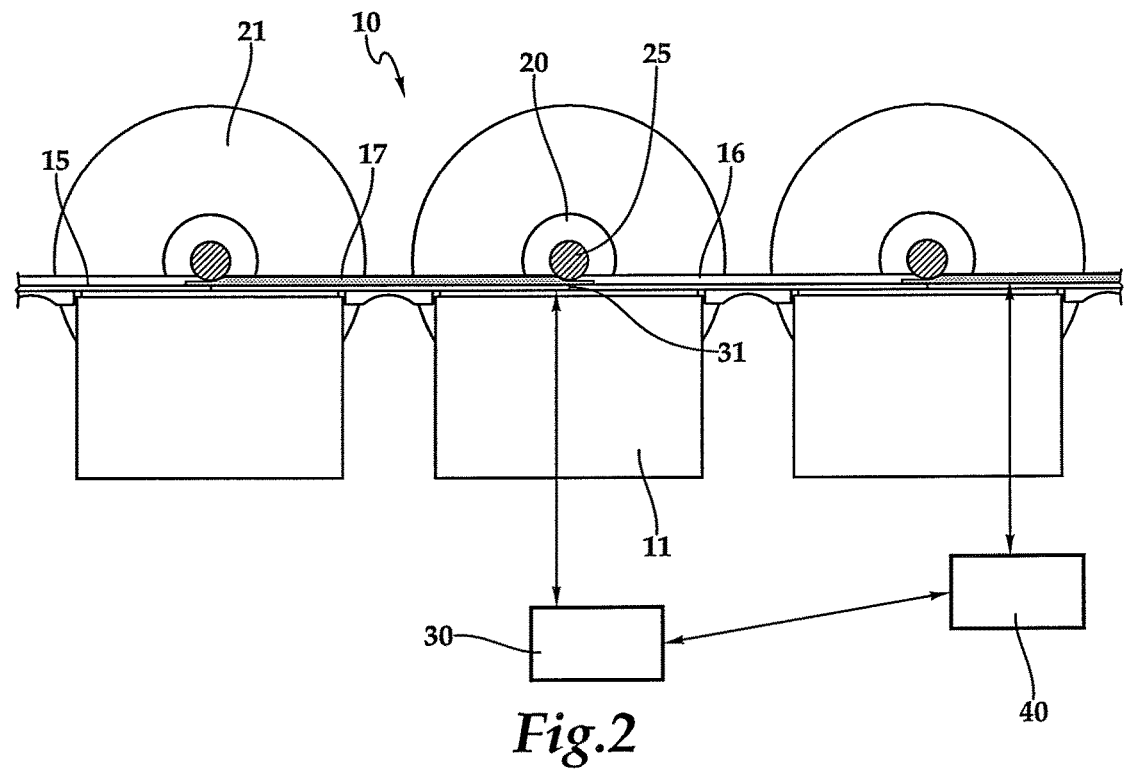
Fig.2
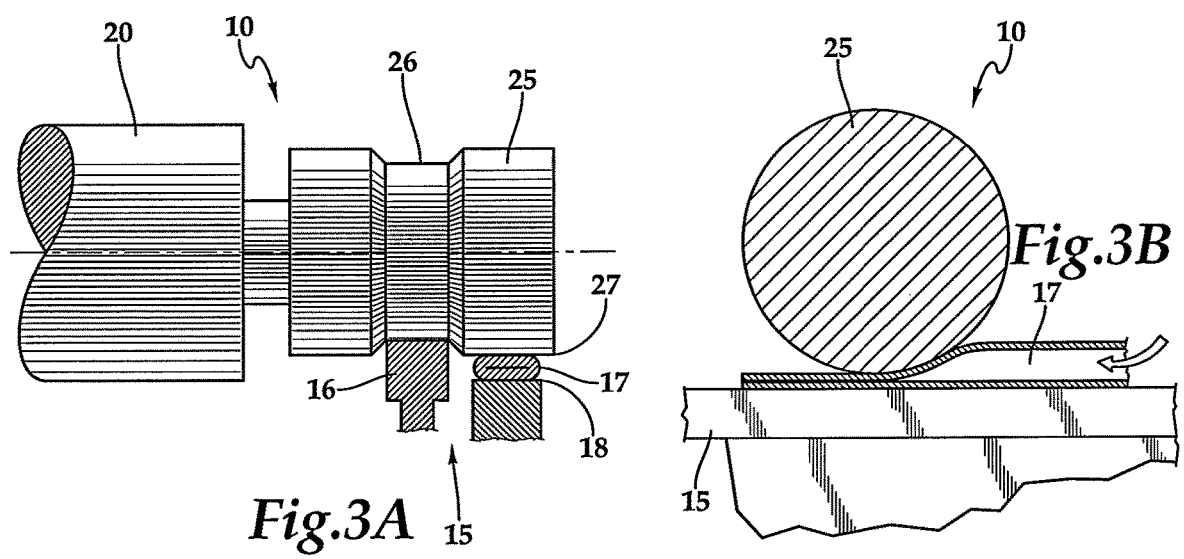
Fig.3A
Fig.3B

REELING SHAFT TRANSFER RAIL SYSTEM AND METHOD OF TRANSFERRING REELING SHAFTS ON A REELING SHAFT TRANSFER RAIL SYSTEM

CROSS REFERENCES TO RELATED APPLICATIONS

This application claims priority on EP 19157656 filed Feb. 18, 2019, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a reeling shaft transfer rail system and to transferring reeling shafts on a reeling shaft transfer rail system.

As known from the prior art fiber web producing processes typically comprise an assembly formed by a number of apparatuses arranged consecutively in the process line. A typical production and treatment line comprises a headbox, a wire section and a press section as well as a subsequent drying section and a reel-up. The production and treatment line can further comprise other sections and devices for finishing the fiber web, for example a sizer, a coating device, or a calender. The production and treatment line also typically comprises at least one slitter-winder for forming customer rolls as well as a roll packaging apparatus. Fiber webs, such as paper or board webs, are manufactured in machines together forming a fiber web manufacturing line, which may be hundreds of meters long. In fiber web manufacturing lines, manufacturing operates as a continuous process.

The finished fiber web being output from the machine is wound with a reel-up around a reeling shaft, i.e. a reel spool, into a parent roll (a machine roll), the diameter of which may be more than 5 meters, and which may weigh more than 160 tons. The purpose of the reeling is to transfer the fiber web from its planar manufacturing form into a form in which it can be handled more easily. The reel-up is thus a device that reels a material, which is produced as a continuous fiber web in a fiber web production line, into the form of a roll: the parent roll. In the production process of the fiber web, the reeling is generally a first process part, wherein a continuous process is discontinued to be continued in sequences. The parent roll is formed around the reeling shaft that functions as a core of reeling, i.e. the fiber web on one parent roll around one reeling shaft has a beginning and an end. The reel-up can be followed by transfer rails, on which one or more parent rolls reeled around the reeling shafts are at least temporarily stored before being transferred to the next stage of fiber web production and treatment.

The web of the parent roll generated during manufacture is full-width and may be more than 100 km long, so it must be cut into partial webs of a suitable width and length for customers and wound around cores into "customer rolls" before dispatch from the mill. As known, this slitting and winding of the web takes place in a separate machine fitted to the purpose, i.e., a slitter-winder. In the slitter-winder the parent roll is unwound in the unwinding station off the reeling shaft and the broad web is slit with the slitting section into a number of narrower partial webs, which are wound with the winding section around winding spools such as cores into customer rolls. When the customer rolls are ready, the slitter-winder is stopped and the group of rolls, or "set", is removed from the machine. After this, the process continues with the winding of a new set. These stages are repeated periodically until the fiber web on the parent roll runs out from the reeling shaft, at which point the parent roll is replaced and the operation restarts with the unwinding of a new parent roll from the reeling shaft. In fiber web production lines unwinding stations are also located in connection with, for example, off-line finishing stations, typically coating or calendering stations.

In the unwinding stations of known fiber web production lines, the parent roll is typically conveyed to such unwinding stations that are not connected to the paper machine with transfer rails, with a crane lowering the rolls to the transfer rails. In applications where the unwinding station is connected to the production line with transfer rails inline, the parent roll is transferred along the transfer rails from reel-up to the unwinding station. The transfer rails for full parent rolls consist of horizontal or inclined rails with stand-by stations. Along transfer rails, the parent roll is transferred from one stand-by station to another until the unwinding station is reached. With horizontal transfer rails, the parent roll is transferred from one stand by station to another by means of a transfer device, and with inclined transfer rails, by means of rolling based on gravity and stop and release mechanisms. Generally, a reeling shaft emptied as a result of unwinding is removed from the unwinding station either through manual lifting with a crane or automatically with a reeling shaft handling apparatus. The unwinding station can be followed by transfer rails, on which one or more empty or almost empty reeling shafts are at least temporarily stored before being transferred to the next stage, for example to storage or to a reel-up. A reeling shaft handling apparatus may comprise either vertical lifting devices or rotatable lifting arms and return transfer rails for empty reeling shafts, located above the transfer rails for parent rolls, often also above the unwinding station or above the slitter-winder. An empty or nearly empty reeling shaft is lifted with a lifting device or with lifting arms to return transfer rails, which normally have a number of return positions. Typically reeling shaft storage is located above the unwinding station. Along the return transfer rails, the reeling shaft is transferred from one station to another either by a transfer device or by rolling based on gravity using stop and release mechanisms. In some cases, the empty winding shaft is removed from the return transfer rails by lowering devices and moved to the reel-up of the machine with a crane or by a transfer cart. The return transfer rails may also be connected directly to the reel-up's reeling shaft storage rails, whereby the reeling shaft may be transferred directly from the unwinding station to the reel-up.

To ensure a smooth continuity of the fiber web production and treatment, storage spaces are needed for full parent rolls, partly filled parent rolls and empty reeling shafts. As known, such storage spaces at the finishing end of the fiber web manufacturing line are located in the main machine line between the main devices of the manufacturing process on transfer rails. Also, a rejecting location for the bottom-ends of parent rolls or partially filled parent rolls in the pulper is needed in connection with the arrangements for handling parent rolls and reeling shafts can be arranged on transfer rails.

As is apparent from the above in a fiber web production and treatment line various transfer rails may be used for the reeling shafts, with or without a fiber web wound on them.

Typically, the transfer rail systems for reeling shafts consist of horizontal or inclined rails with stand-by stations, with means to stop the reeling shaft at the desired station. The inclined rails are typically only slightly inclined, about 0.1-0.5 degrees downhill inclination in the downstream direction of the transfer. Each system has two parallel rails with one end of the reeling shaft supported on one rail and the other end of the reeling shaft supported on the other rail. In the known transfer rail systems there also may be gate transfer rails that connect to the transfer rails at each end of the gate transfer rails and that are openable if needed, for example to move a reeling shaft to or from the transfer rails, for example from a transfer cart for reeling shafts.

In the known transfer rails systems, the station location, where to stop the reeling shaft, has been fixed due to the needed stopping means.

Further, also sometimes there has been a possibility of a colliding effect, in case too many reeling shafts have been on the transfer rails simultaneously or the stopping has not been functioning correctly. Especially in the case of parent rolls this type of domino-effect is extremely dangerous due to their size and weight. Also, the direction of movement of the reeling shafts has been fixed in some types of the known transfer rail systems, for example in transfer rail systems with inclined transfer rails without carriage arrangements for transfer of the reeling shafts, as the configuration does not allow movement backwards.

The known transfer rail systems, thus, need a lot of equipment, for example actuators, energy transfer devices, and means to stop the reeling shafts at the desired station.

An object of the present invention is to create a new transfer rail system for transferring reeling shafts and a new method of transferring reeling shafts on a reeling shaft transfer rail system to achieve simple, flexible and cost-effective transfer of parent rolls and reeling shafts on the transfer rails in connection with the production of fiber webs.

SUMMARY OF THE INVENTION

An object of the present invention is to create a new transfer rail system for transferring reeling shafts and a new method of transferring reeling shafts on a reeling shaft transfer rail system to achieve simple, flexible and cost-effective transfer of parent rolls and reeling shafts on the transfer rails in connection with the production of fiber webs.

One object of the invention is to further develop reeling shaft transfer rail systems and methods of transferring reeling shafts on a reeling shaft transfer rail system in which the reeling shaft moves on substantially horizontal or slightly inclined rails.

One object of the invention is to create a reeling shaft transfer rail system and a method of transferring reeling shafts on a reeling shaft transfer rail system, in which the disadvantages and problems of the systems and methods known from the prior art are eliminated or at least minimized.

In order to achieve the above objects and those that become apparent later, the reeling shaft transfer rail system according to the invention is mainly characterized by the features having a reeling shaft transfer rail system with at least partially pressurized hoses arranged on each of the transfer rails for moving and stopping the movement of the reeling shaft to be transferred. In the method of transferring reeling shafts on a reeling shaft transfer rail system, where reeling shafts are transferred on two parallel, substantially horizontal transfer rails or are transferred on slightly inclined transfer rails downstream in the main transfer direction i.e., the transfer rails if inclined are inclined in a downstream direction. The transfer rails support each of the supporting ends of reeling shafts which are transferred in a reeling shaft transfer rail system having at least partially pressurized hoses arranged on each of the transfer rails for moving and stopping the reeling shafts which are transferred.

In this description and the claims by reeling shafts are meant reeling shafts with or without fiber web on them i.e. parent rolls, reject rolls, almost empty reeling shafts and empty reeling shafts. Also, by the term transfer rail is to be understood transfer rails, on which the reeling shafts are moved, i.e. also the parts of transfer rails that extend on, for example, a gate of the transfer rail and a transfer rail can be formed as a one-piece extending transfer rail or as a transfer rail formed of more than one piece.

According to the invention the reeling shaft transfer rail system comprises two parallel, substantially horizontal or slightly downstream of the main transfer direction inclined transfer rails for supporting each of the supporting ends of a reeling shaft and at least partially pressurized hoses arranged on each of the transfer rails for moving and stopping the movement of the reeling shaft to be transferred.

According to an advantageous feature of the invention the reeling shaft transfer rail system further comprises a pressure system connected to the at least partially pressurized hoses for adjusting pressure and/or flow rate of pressure medium inside the at least partially pressurized hoses to move and stop the reeling shaft to be transferred.

According to an advantageous feature of the invention the at least partially pressurized hoses on each of the transfer rails are located to be in contact with the supporting end of the reeling shaft.

According to an advantageous feature of the invention the reeling shaft transfer rail system further comprises a guide on each of the transfer rails to locate the corresponding supporting end of the reeling shaft on the corresponding transfer rail.

According to an advantageous feature of the invention the at least partially pressurized hoses are formed of several spaced apart in the main transfer direction extending parts of the at least partially pressurized hoses.

According to an advantageous feature of the invention one part of the at least partially pressurized hose extends over at least two stopping stations of the reeling shafts on the transfer rail.

According to an advantageous feature of the invention parts of the at least partially pressurized hose are arranged alternatingly on each transfer rail such that one part of the at least partially pressurized hoses supports the supporting end of the reeling shaft at selected time.

According to an advantageous feature of the invention the reeling shaft transfer rail system further comprises a position measurement system with position sensors connected to the pressure system to measure and control the location of the reeling shafts on the transfer rails.

According to an advantageous feature of the invention the distance between the supporting surface of the supporting end of the transfer rail is adjustable in order to provide a desired compression pressure to the at least partially pressurized hose to prevent pressure release from under the supporting end of the reeling shaft by passage of fluid.

According to the invention in the method of transferring reeling shafts on a reeling shaft transfer rail system the reeling shafts are transferred on two parallel, substantially horizontal or slightly downstream of main transfer direction inclined transfer rails for supporting each of the supporting ends of a reeling shaft, and the reeling shafts are transferred in the reeling shaft transfer rail system having at least partially pressurized hoses arranged on each of the transfer rails for moving and stopping the reeling shafts to be transferred.

According to an advantageous feature of the invention in the method the reeling shafts to be transferred are moved and stopped by adjusting pressure and/or flow rate of the pressure medium inside the at least partially pressurized hoses by controlling a pressure system connected to the at least partially pressurized hoses.

According to an advantageous feature of the invention in the method, the transfer movement of the reeling shaft is provided by increasing the pressure in the pressurized hose on the upstream side of the reeling shaft and creating on the other, downstream, side of the at least partially pressurized hose no pressure or a lower pressure than on the upstream side of the reeling shaft in the at least partially pressurized hose.

According to an advantageous feature of the invention in the method, stopping of the transfer movement of the reeling shaft is provided by controlling side pressures at each side of the reeling shaft in the at least partially pressurized hoses of substantially the same level. The pressure side of the at least partially pressurized hose preventing the movement is closed until a determined pressure is reached and the movement of the reeling shaft is stopped. The pressure is kept at the determined level for example by controlling the pressure and/or the flow rate of the pressure medium inside the at least partially pressurized hose by the pressure system, for example by pressure relief valve(s) connected to the pressure system.

In connection with the reeling shaft transfer rail system and the method of transferring reeling shafts on the reeling shaft transfer rail system according to the invention and its advantageous features, the transfer of the reeling shafts on the transfer rails is accomplished by the at least partially pressurized hoses located on the transfer rails in an exact location i.e. advantageously between the accurately machined support surface of the transfer rails and the accurately machined supporting part of the end of the reeling shaft, more advantageously the bearing housing at the end of the reeling shaft. Thus, the compression of the at least partially pressurized hose is accurately controllable and adjustable by adjusting the position of the at least partially pressurized hose in relation to the reeling shaft. The compression of the hose by the support end of the reeling shaft and the transfer rail is to ensure that the pressure medium does not leak under the reeling shaft. The transfer rail system thus comprises the at least partially pressurized hoses that can be continuous or made of successive parts of hoses, which may continue directly one after another or spaced in the longitudinal direction of the transfer rails one after another on the transfer rail and correspondingly on the other rail.

Advantageously, one at least partially pressurized hose covers at least two stopping stations next to each other. The at least partially pressurized hose is advantageously pressurized by fluid, for example by gas, advantageously by pressurized air, or by liquid, advantageously water. By pressurizing the at least partially pressurized hose means by liquid higher pressures can be used.

In transferring reeling shafts along the transfer rails, it is very important to synchronize the movement of the ends of the reeling shafts along each transfer rail, which can easily and accurately be accomplished by throttle control of the pressurized fluid.

By the invention and its advantageous features many advantages are achieved, for example a very simple and light structure transfer rail system is achieved as no moving actuators nor energy transfer devices etc. are needed. The moving reeling shaft can be stopped at any desired location and thus stopping stations can be formed at desired intervals depending on the need at the time. The domino effect disadvantage in known systems can be prevented by the at least partially pressurized hose means preventing the unwanted movement and by the throttle control preventing movement caused by outside force. The movement direction of the reeling shaft on the reeling shaft transfer rails controlled by the pressurized hose can be forwards and backwards in view of the main transfer direction along the reeling shaft transfer rails. The reeling shaft transfer rail system also provides the possibility of simultaneous movement of several reeling shafts and thus only low speed is needed in order to accomplish the desired movements of the reeling shafts in the desired time, which means increased safety.

BRIEF DESCRIPTION OF THE DRAWINGS

In the following the invention is described in detail with reference to the accompanying drawing.

FIG. 2 is a schematic side elevational view of the reeling shaft transfer rail system of FIG. 1.

FIG. 3A is a fragmentary front elevational detail view of the end of the reeling shaft of the transfer rail system of FIGS. 1 and 2.

FIG. 3B a fragmentary schematic side elevational detail view of the end of the reeling shaft of the transfer rail system of FIGS. 1 and 2.

DESCRIPTION OF THE PREFERRED EMBODIMENTS

Figure 1:
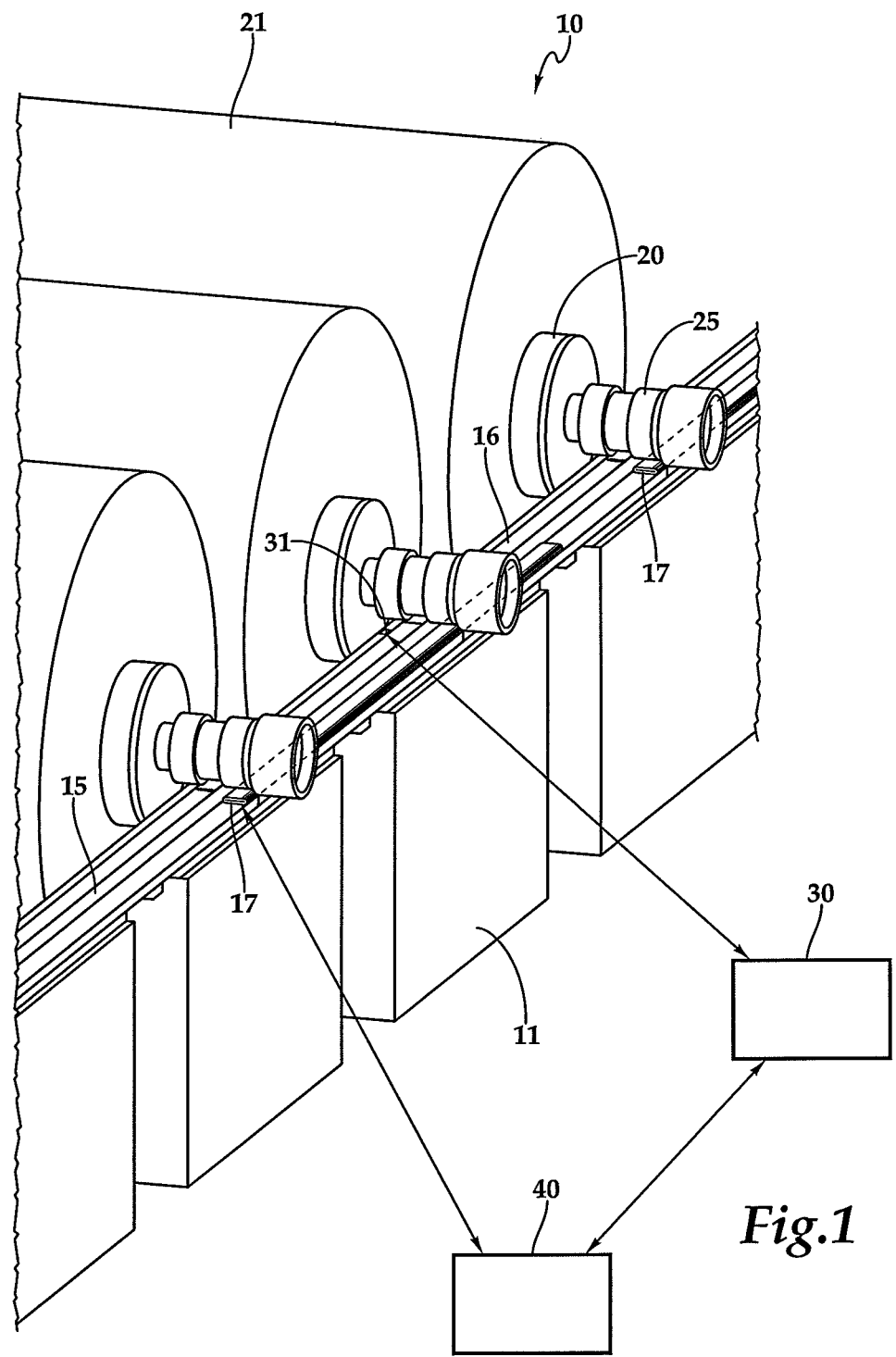
FIG. 1. is a schematic partial isometric view of a reeling shaft transfer rail system in accordance with the invention.

During the course of the following description relating to FIGS. 1-3B like numbers and signs will be used to identify like elements according to the different views which illustrate the invention and its advantageous examples. In the figures some repetitive reference signs have been omitted for clarity.

In FIG. 1 is shown a schematic example of a reeling shaft transfer rail system 10. The reeling shaft transfer rail system 10 is built on a frame 11. The frame 11 supports the reeling shafts 20 at each end of the reeling shaft 20. In FIG. 1 is shown only one end of the reeling shaft 20 and only one side of the reeling shaft rail system but it is to be understood that at the other end of the reeling shaft 20 a corresponding arrangement is located and thus the reeling shaft transfer rail system 10 comprises corresponding elements, structures etc. at each end of the reeling shaft 20 i.e. at each side of the transfer rail system 10. On the frame a transfer rail 15 is located, on which a supporting end 25 of the reeling shaft 20 is located. The transfer rail 15 comprises a guide 16 for guiding the movement direction of the reeling shaft 20 and an at least partially pressurized hose 17 which supports the supporting end 25 of the reeling shaft 20. By controlling the pressure and/or the flow rate of the pressure medium inside the at least partially pressurized hose means 17 the reeling shaft 20 can be moved along the transfer rail 15 and stopped at a desired location. In the example of FIG. 1 the reeling shaft 20 has a fiber web wound around it, i.e. a parent roll 21 is formed around the reeling shaft 20. The at least partially pressurized hose 17 is connected to a pressure system for creating and controlling the pressure and/or the flow rate of the pressure medium, pressure fluid, inside the at least partially pressurized hoses 17 which are on each side of the reeling shaft 20 on at least some parts of the surface 18 of the transfer rail 15. On the transfer rail of the transfer rail system 10 are located the at least partially pressurized hoses 17 which are at least controllably connected to each other in order to synchronize the movements of each supporting end 25 of the reeling shaft 20.

In FIG. 2 is shown a schematic example of the reeling shaft transfer rail system 10 of FIG. 1 as a side view. The transfer rail 15 extends over a length and is supported by the frame 11, which in this example is formed of several frame parts, advantageously of concrete. Also, in FIG. 2 is shown only one end of the reeling shaft 20 and it is to be understood that at the other end of the reeling shaft 20 a corresponding arrangement is located. On the transfer rail 15 is located the supporting end 25 of the reeling shaft 20. The transfer rail 15 comprises a guide 16 for guiding the movement direction of the reeling shaft 20 extending continuously along the transfer rail 15. The at least partially pressurized hoses 17 on the supporting surface 18 of a transfer rail supports the end 25 of the reeling shaft 20. The pressurized hose 17 in the example of FIGS. 1 and 2 is formed of several parts, spaced apart in the main direction along which the parent rolls 21 move. Extending parts of the at least partially pressurized hoses 17 are used to hold or move one or more of the reeling shafts 20. Advantageously, one part of the at least partially pressurized hose 17 covers at least two stopping stations next to each other as shown in the FIG. 2. The parts of the at least partially pressurized hoses 17 can be arranged alternatingly on each transfer rail 15 such that one part of the at least partially pressurized hoses 17 supports the supporting end 25 of the reeling shaft 20 at the time.

The at least partially pressurized hose means can also extend along the transfer rail 15 as one piece. By controlling the pressure and/or the flow rate of the pressure medium inside the at least partially pressurized hose means 17 the reeling shaft 20 can be moved along the transfer rail 15 and stopped at a desired location. In the example of FIG. 1 the reeling shaft 20 has a fiber web around it, i.e. a parent roll 21 is formed around the reeling shaft 20. The at least partially pressurized hose means 17 is connected to a pressure system for creating and controlling the pressure and/or the flow rate of the pressure medium, pressure fluid, inside the at least partially pressurized hose means 17 and on each side of the reeling shaft transfer rail system located pressurized hose means 17 are at least controllably connected to each other in order to synchronize the movements of each supporting end 25 of the reeling shaft 20.

In FIGS. 3A-3B is shown schematically a detail view of the supporting end 25 of the reeling shaft 20 on the transfer rail system 10. The supporting end of the reeling shaft 20 comprises a guide groove 26, to which the guide 16 of the transfer rail system 10 is located to place the supporting end of the reeling shaft 20 at the correct location on the transfer rail 15. The pressurized hoses 17 support the supporting end 25 of the reeling shaft 20 at its support surface 27 on the support surface 18 of the transfer rail 15. The distance between the supporting surface 27 of the supporting end 25 and the transfer rail 15 is advantageously adjustable in order to provide a desired compression pressure to the at least partially pressurized hose means 17 to prevent pressure release by flow of fluid from under the supporting end 25 of the reeling shaft 20. As can be seen from FIGS. 3A-3B, when the reeling shaft 15 is to be moved along the transfer rail 15 the pressure inside the at least partially pressurized hose means 17 is controlled by increasing or decreasing the pressure such that movement to a desired direction is possible or such that the reeling shaft 20 is stopped at the desired stopping station. The at least partially pressurized hose means 17 is connected to a pressure system for creating and controlling the pressure and/or the flow rate of the pressure medium, pressure fluid, inside the at least partially pressurized hose means 17 and on each side of the reeling shaft transfer rail system located at least partially pressurized hose means 17 are at least controllably connected to each other in order to synchronize the movements of each supporting end 25 of the reeling shaft 20.

In connection with the reeling shaft transfer rail system 10, the transfer of the reeling shafts 20 on the transfer rails 15 is accomplished by the at least partially pressurized hose 17 located on the transfer rails 15 in an exact location i.e. advantageously between the accurately machined support surface 18 of the transfer rails 15 and the accurately machined supporting surface 27 of the end of the reeling shaft 20 as shown in FIG. 3A. The movement of the reeling shaft 20 is caused by increasing the pressure in the pressurized hoses 17 on the upstream side of the reeling shaft 20 and on the other downstream side of the at least partially pressurized hoses are without pressure or at a low pressure. The stop of the movement of the reeling shaft 20 is caused by increasing pressure at each side of the reeling shaft 20. The at least partially pressurized hoses 17 are pressurized by fluid, for example by gas, advantageously pressurized air, or by liquid, advantageously water. In transferring reeling shafts 20 along the transfer rails 15 of the reeling shaft transfer rail system 10, the movement of the supporting ends 25 of the reeling shafts 20 along each transfer rail 15 is synchronized by a throttle control of the pressurized fluid in the at least partially pressurized hoses 17. The at least partially pressurized hoses 17 are connected to a pressure system 40 for creating and controlling the pressure and/or the flow rate of the pressure medium, pressure fluid, inside the at least partially pressurized hoses 17 and on each side of the reeling shaft 20 of the transfer rail system 10. The at least partially pressurized hoses 17 are at least controllably connected to each other in order to synchronize the movements of each supporting end 25 of the reeling shaft 20. The reeling shaft transfer rail system 10 may also comprise a position measurement system 30 with position sensors 31 as shown in FIG. 1 which are connected to the pressure system 40 to measure and control the location of the reeling shafts 20. The at least partially pressurized hoses 17 may have a coating or a separate surface element or be surface treated to increase or decrease the friction of the surface of the at least partially pressurized hoses 17. Also, the supporting ends 25 of the reeling shafts may comprise a coating or be surface treated to adjust the movement properties i.e. to increase or decrease the friction.

Partially pressurized hoses or pressurizable hoses are fillable flexible tubes or hoses that when filled with fluid under pressure push or hold a reeling shaft and the roll formed thereon. Each hose can have one or preferably a plurality of connections e.g. at both ends and at positions along the hose. The connections receive fluid from the pressure system, which may also have a drain reservoir or sump so the pressure system can receive fluid from the connections to the hose. By selecting where fluid is supplied to or drained from the hoses, the reeling shafts can be pushed from one side or the other. The pressurizable hoses can be fill on one side as shown in FIG. 3B or both side, to temporarily hold the location of a reeling shaft.

In the description in the foregoing, although some functions have been described with reference to certain features, those functions may be performable by other features whether described or not. Although features have been described with reference to certain embodiments or examples, those features may also be present in other embodiments or examples whether described or not.

Above only some advantageous examples of the invention have been described to which examples the invention is not to be narrowly limited and many modifications and alterations are possible within the invention.

I claim:

1. A reeling shaft transfer rail system, comprising:
two parallel transfer rails for supporting each end of a reeling shaft wherein the two parallel transfer rails are substantially horizontal or inclined about 0.1-0.5 degrees downhill in a downstream direction in which the reeling shaft moves;
pressurizable hoses arranged on each of the two parallel transfer rails, each pressurizable hose connected to a source of pressurized fluid for moving and stopping movement of the reeling shaft;
wherein each of the two parallel transfer rails further comprises:
a guide for guiding the movement direction of the reeling shaft, wherein the guide extends continuously along the transfer rail and supports the ends of the reeling shaft by engaging a guide groove;
a support surface of one of the transfer rails on which at least one of said pressurizable hoses lies so said at least one of said pressurizable hoses engages a support surface on one of the ends of the reeling shaft; and
wherein for each of the two transfer rails a distance between the supporting surface formed on the end of the reeling shaft and the support surface of the transfer rail is adjustable so as to control compression pressure applied to the pressurizable hose therebetween.

2. The system of claim 1 further comprising:
a pressure system forming the source of pressurized fluid, the pressure system being in communicating relation with each of the pressurizable hoses and arranged to adjust at least one of: pressure of the pressurized fluid, and flow rate of the pressurized fluid to pressurize or fill at least one of the pressurizable hoses so as to move, stop or hold the reeling shaft along the two parallel transfer rails.

3. The system of claim 2 further comprising a second parent roll on a second reeling shaft having two seconds ends, and wherein the pressurizable hoses on each of the transfer rails are located in contact with supporting parts of the two ends of the reeling shaft and the two second ends of the second reeling shaft.

4. The system of claim 3 wherein the pressurizable hoses have several parts which are spaced apart in the downstream direction.

5. The system of claim 4 wherein the pressurizable hoses extend over two selected stopping stations on the transfer rails such that each of the two ends of the reeling shaft are spaced apart so as to separate parent rolls wound on each of the reeling shaft from the two second ends of the second reeling shaft.

6. The system of claim 4 wherein the pressurizable hoses are arranged spaced on each transfer rail such that one of the several parts of each of the pressurizable hoses supports one end of the reeling shaft or second reeling shaft at a time.

7. The system of claim 2 further comprising position sensors connected in signal transmitting relation to a position measurement system which is connected in communicating relation to the pressure system and wherein the pressure system is arranged to measure and control the location of the reeling shafts on the transfer rails.

8. The system of claim 1 further comprising a guide on each of the transfer rails to engage a supporting surface on each end of the reeling shaft.

9. A transfer rail system for reeling shafts on which a fiber web is wound in a paper or board machine during formation of the fiber web to form a parent roll of a full width of the fiber web as formed on a reeling shaft, comprising:
two parallel transfer rails for supporting one of two ends of the reeling shaft wherein the two parallel transfer rails are substantially horizontal or inclined about 0.1-0.5 degrees downhill in a downstream direction in which the reeling shaft moves;
each of the two parallel transfer rails having a guide surface engaging one of the two ends of the reeling shaft to support the weight of the reeling shaft and the parent roll formed thereon, wherein each of the transfer rails has a hose support surface;
a pressurizable hose arranged on each of the hose support surfaces, wherein each pressurizable hose is connected to a source of pressurized fluid for moving and stopping movement of the reeling shaft and the parent roll formed thereon.

10. The transfer rail system of claim 9 further comprising:
a pressure system forming the source of pressurized fluid, the pressure system being in communicating relation with each of the pressurizable hoses and arranged to adjust at least one of: pressure of the pressurized fluid, and flow rate of the pressurized fluid to pressurize or fill at least one of the pressurizable hoses so as to move, stop or hold the reeling shaft along the two parallel transfer rails.

11. The transfer rail system of claim 10 further comprising a second parent roll on a second reeling shaft having two second ends, and wherein the pressurizable hoses on each of the transfer rails are located in contact with supporting parts of the two ends of the reeling shaft and the two second ends of the second reeling shaft.

12. The transfer rail system of claim 11 wherein the pressurizable hoses extend over two selected stopping stations on the transfer rails such that each of the two ends of the reeling shaft are spaced apart from the two second ends of the second reeling shaft so as to separate parent rolls wound on each of the reeling shaft and the second reeling shaft.

13. The transfer rail system of claim 11 wherein the pressurizable hoses are arranged spaced on each transfer rail such that one of the several parts of each of the pressurizable hoses supports one end of the reeling shaft or second reeling shaft at a time.

14. The transfer rail system of claim 9 wherein each of the two ends of the reeling shaft has portions defining a guide groove, and wherein the guide surface on each of the transfer rails is positioned to engage within one of said guide grooves.

15. The transfer rail system of claim 9 wherein the pressurizable hoses have several parts which are spaced apart in the downstream direction.

16. The transfer rail system of claim 9 further comprising position sensors connected in signal transmitting relation to a position measurement system which is connected in communicating relation to the pressure system and wherein the pressure system is arranged to measure and control the location of the reeling shaft on the transfer rails.

* * * * *